United States Patent
Wu (10) Patent No.: US 11,994,979 B2
(45) Date of Patent: May 28, 2024

(54) SMART REGRESSION TEST SELECTION FOR SOFTWARE DEVELOPMENT

(71) Applicant: Synopsys, Inc., Mountain View, CA (US)

(72) Inventor: Xiaoliang Wu, Shanghai (CN)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/318,943

(22) Filed: May 12, 2021

(65) Prior Publication Data
US 2021/0357314 A1    Nov. 18, 2021

Related U.S. Application Data

(60) Provisional application No. 63/024,328, filed on May 13, 2020.

(51) Int. Cl.
| | |
|---|---|
| *G06F 9/44* | (2018.01) |
| *G06F 11/36* | (2006.01) |
| *G06F 16/22* | (2019.01) |
| *G06F 16/245* | (2019.01) |
| *H04L 9/06* | (2006.01) |

(52) U.S. Cl.
CPC ...... *G06F 11/3688* (2013.01); *G06F 11/3676* (2013.01); *G06F 16/2255* (2019.01); *G06F 16/245* (2019.01); *H04L 9/0643* (2013.01)

(58) Field of Classification Search
CPC .......... G06F 11/3688; G06F 16/245; G06F 16/2255; H04L 9/0643
See application file for complete search history.

(56) References Cited

U.S. PATENT DOCUMENTS

| | | | |
|---|---|---|---|
| 2005/0223361 A1* | 10/2005 | Belbute | G06F 11/3688 717/124 |
| 2008/0126867 A1* | 5/2008 | Pandarinathan | G06F 11/3688 714/E11.178 |
| 2009/0228680 A1* | 9/2009 | Reddy | G06F 11/1453 711/216 |
| 2010/0287534 A1* | 11/2010 | Vangala | G06F 11/3612 717/124 |
| 2012/0167055 A1* | 6/2012 | Yokoi | G06F 11/3684 717/126 |

(Continued)

OTHER PUBLICATIONS

Elbaum, S.G., et al., "Incorporating Varying Test Costs and Fault Severities Into Test Case Prioritization, Proceedings of the International Conference on Software Engineering (ICSE 2001)," ACM Press, 2001, pp. 329-338.

(Continued)

*Primary Examiner* — Hang Pan
(74) *Attorney, Agent, or Firm* — Weaver Austin Villeneuve & Sampson LLP (57) ABSTRACT

A method of testing a change in a software code includes, searching a database of tests to identify a subset of the tests that include a function that executes the change, forming, from the subset, a multitude of groups each having a different execution path. The tests in the same group have the same execution path. The method further includes prioritizing the tests within each of the multitude of groups based on one or more testing characteristics, and selecting, from each of the groups, one or more of the prioritized tests to test the change.

20 Claims, 3 Drawing Sheets

(56) References Cited

U.S. PATENT DOCUMENTS

| | | | | |
|---|---|---|---|---|
| 2014/0115565 A1* | 4/2014 | Abraham | ............. | G06F 11/368 |
| | | | | 717/131 |
| 2014/0282329 A1* | 9/2014 | Aggarwal | ............. | G06F 30/398 |
| | | | | 716/112 |
| 2015/0026664 A1* | 1/2015 | Bartley | ............... | G06F 11/3676 |
| | | | | 717/124 |

OTHER PUBLICATIONS

Elbaum, S.G., et al., "Prioritizing Test Cases for Regression Testing, Proceedings of the International Symposium on Software Testing and Analysis (ISSTA 2000)," ACM Press, 2000, pp. 102-112.

Elbaum, S.G., et al., "Understanding and Measuring the Sources of Variation in the Prioritization of Regression Test Suites, Proceedings of the Seventh International Software Metrics Symposium (METRICS 2001)," IEEE Computer Press, MD, 2001, pp. 169-179.

Rothermel, G., et al., "Analyzing Regression Test Selection Techniques," IEEE Transactions on Software Engineering, Aug. 1996, vol. 22(8), pp. 529-551.

Rothermel, G., et al., "Test Case Prioritization: an Empirical Study, Proceedings of the International Conference on Software Maintenance (ICSM 1999)," IEEE Computer Press, MD, 1999, pp. 179-188.

* cited by examiner

SMART REGRESSION TEST SELECTION FOR SOFTWARE DEVELOPMENT

RELATED APPLICATION

The present application claims benefit under 35 USC 119(e) of U.S. Patent Application No. 63/024,328, filed May 13, 2020, the content of which is incorporated herein by reference in its entirety.

TECHNICAL FIELD

The present disclosure relates to testing of software, and more particularly to regression testing of a change in a software code.

BACKGROUND

In an iterative and/or incremental software development process, the software code may be changed in a relatively short time period to accommodate addition of a new code or facilitate the modification of an existing code. Such additions or modifications, however, may create new faults in the code. Regression testing (RT) may be used to ensure that any additions or modifications are free of faults and do not adversely affect other portions of the software. Regression testing is effective when applied as part of a systematic and continuous integration/deployment flow.

SUMMARY

A method of testing a change in a software code, in accordance with one embodiment of the present disclosure, includes, in part, searching, by a processor, a database of tests to identify a subset of the tests that execute a function that covers the change, forming, from the subset, a multitude of groups each having a different execution path. The tests in the same group have the same execution path. The method further includes, in part, prioritizing the tests within each of the groups based on one or more testing characteristics, and selecting, from each of the groups, one or more of the prioritized tests to test the change.

A non-transitory computer readable medium, in accordance with one embodiment of the present disclosure, includes stored instructions, which when executed by a processor, cause the processor to search a database of tests to identify a subset of the tests that execute a function that covers a software code change, form, from the subset, a multitude of groups each having a different execution path. The tests in the same group have the same execution path. The instructions further cause the processor to prioritize the tests within each of the groups based on one or more testing characteristics, and select, from each of the groups, one or more of the prioritized tests to test the code change.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Software that has been modified either to include new functionality or to improve an existing functionality is often tested before being released for wider or commercial use. A suite of tests developed to test earlier versions of the software often exists in a database. However, applying the test suites in their entirety when the software modification includes a limited number of changes is time consuming and resource intensive.

Embodiments of the present disclosure identify from among an existing database of test suites a list that executes one or functions covering the lines that have been modified in a software program. One or more criteria selected based on, for example, priority and/or resource usage are then applied to further reduce the number of tests on the list. Accordingly, embodiments of the present disclosure achieve an order of magnitude of reduction in testing of a modified software.

Figure 1:
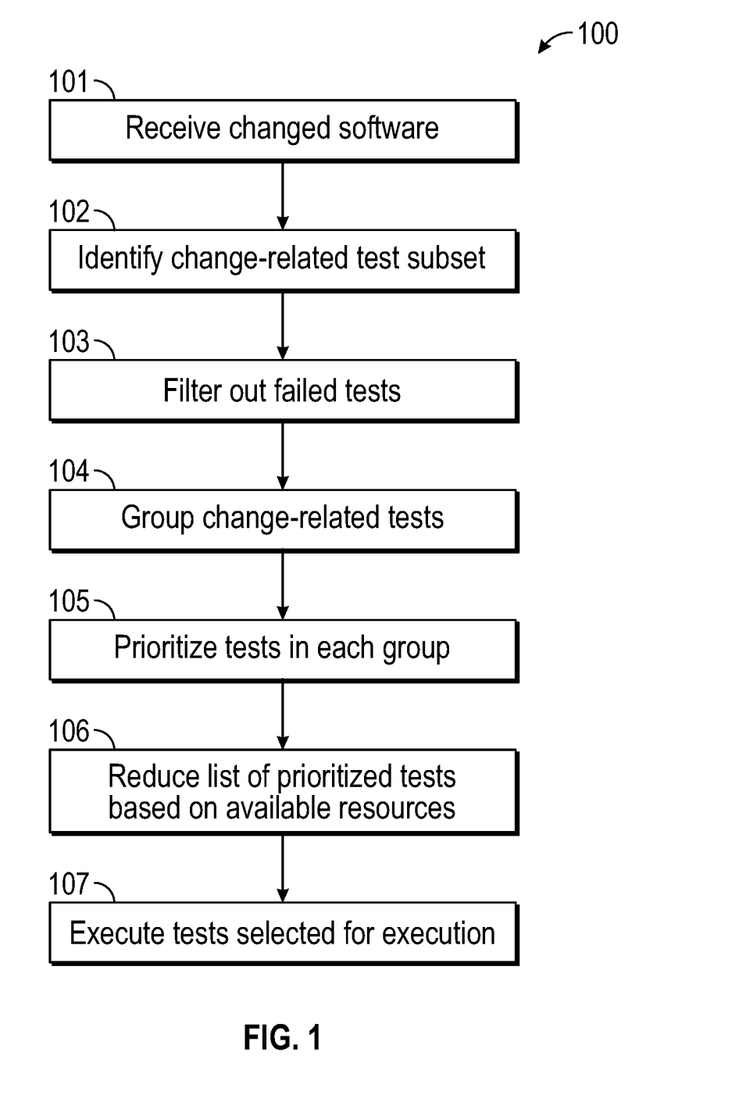
FIG. 1 is a flowchart of processes used to test a change in a software code, in accordance with one embodiment of the present disclosure.

FIG. 1 is a flowchart 100 of steps used to test a modified (changed) software, in accordance with one embodiment of the present disclosure. At 101, software that includes modifications/changes is received. At 102, the existing database of tests that have been previously developed to test the software are searched to identify a subset of tests that execute one or more functions covering the changes, also referred to herein as a change-related test subset. For example, line 66 of a programming code in a file named A is changed. In another example, there are 1000 different tests that have been previously developed and stored in a database to test the code in file A. At 102, the database search identifies, from among the 1000 tests, a subset of tests that test the code in line 66. A number of open-source software tools, such as Gcov, or ctags, exist that may be used to perform the search and identify the tests that cover and thus test the software changes. Gcov is a source code coverage analysis and statement-by-statement profiling tool. Gcov generates exact counts of the number of times each statement in a program is executed and annotates source code to add instrumentation. Ctags is a programming tool that generates an index file of names found in source and header files of various programming languages to aid code comprehension. Such software tools may also provide information about the degree of coverage that any of the identified tests can provide. The process of identifying, from among existing tests, a subset that covers a changed code is referred to herein alternatively as mapping. Tests that are unrelated to and do not cover the changed code are filtered out and eliminated from further consideration.

At 103, the tests that have previously failed to detect whether a fault has been created by the changed code are also filtered out and eliminated from the subset determined at 102. At 104, the subset of tests identified at 102 are grouped based on the execution paths of the function that executes the changed code. For example, the tests subset may be divided into 3 different groups each having a different execution path. Tests in the same group have the same execution path. At 105, the tests in each group are prioritized for selection based on or more testing characteristics. In one embodiment, the turn-around time (TAT) of a test may be used as a testing characteristic for prioritization.

In another embodiment, the fault detection capability of a test, determined from the historical failure rates associated with the test, may be used as the testing characteristic to prioritize the tests within each group.

At 106, the tests prioritized within each test group are evaluated based on such factors as resource availability and timing requirements to further reduce the number of tests within each group. For example, a user requires that the testing of a change be completed within a given time interval using a given server farm. In another example, there are three group of tests that have been prioritized, as described above, for the testing of the change. The user may then select the first two prioritized tests from group I, the first three prioritized tests from group II, and only the first prioritized test from group III for testing of the change. If the user allocates more computing resources or time to perform the testing, more tests from each group may be selected. At 107, the tests selected within each group at 106 are executed to test the change.

Performing a search of a test database, as described above, based on the line number of a code that has changed may not always provide an accurate result. For example, the code's line number may have changed if the file containing the code has been previously modified by another user. Accordingly, in one embodiment, to obtain the mapping described above, first the function that includes, and therefore executes, the changed code is identified. Thereafter, a software tool, such as open-source tools Gcov or Ctags, is used to identify, form the database of existing tests (referred to herein alternatively as database), both the tests that include the function, as well as the line number(s) of the function within each such test. For example, a modified line of code is executed in a software program by function F. Accordingly, the database is searched to identify the tests that execute function F. The search also identifies the lines numbers within each identified test that executes function F.

Assume that a line of code in a file named x.cpp and executed by a function named wfb::workflowBrowser::workflowBrowser(QWidget*)—referred to herein as function wfb—is modified. Assume further that a software tool, such as Gcov, identifies from an existing database six different tests, namely TC_A, TC_B, TC_C, TC_D, TC_E, and TC_F, that execute the function wfb. The tool also identifies the line numbers within each of the tests that the function appears. Below is an exemplary output of Gcov for the exemplary test TC_A:

"file:x.cpp
function:33,1,wfb::workflowBrowser::workflowBrowser
   (QWidget*)
lcount:33,1
lcount:39,1
lcount:43,1
lcount:44,1
lcount:47,1
lcount:48,1
count:50,1"

The above output shows that the function wfb is executed once in each of lines 33, 39, 43, 44, 47, 48 and 50 of test TC_A, as indicated by notation "lcount". In other examples, the function so identified (e.g. wfb) may be executed more than once in one or more of the designed lines. For test TC_A, the execution path of the function wfb is defined as:
   exectionPath("x.cpp",   "wfb::workflowBrowser::workflowBrowser(QWidget*)", "TC_A")="33,39,43,44,47,48,50"

In other words, the execution path for function wfb of test TC_A is "33, 39, 43, 44, 47, 48, 50". Assume that the execution path for function wfb in each of the other tests TC_B, TC_C, TC_D, TC_E TC_F as determined by software tool Gcov is as shown below:
   executionPath("x.cpp",   "wfb::workflowBrowser::workflowBrowser(QWidget*)", "TC_B")="33,39,43,44,47,48,50"
   exectionPath("x.cpp",   "wfb::workflowBrowser::workflowBrowser(QWidget*)", "TC_C")="33,39,43,44,47,48,50"
   executionPath("x.cpp",   "wfb::workflowBrowser::workflowBrowser(QWidget*)", "TC_D")="33,39,45,46,47,48,50"
   executionPath("x.cpp",   "wfb::workflowBrowser::workflowBrowser(QWidget*)", "TC_E")="33,39,43,44,47,48,50"
   executionPath("x.cpp",   "wfb::workflowBrowser::workflowBrowser(QWidget*)", "TC_F")="33,39,43,44,47,48,50"

As seen from the example above, function wfb in test TC_D has the execution path "33,39,45,46,47,48,50" that is different from the execution path of function wfb in the other five tests which is "33,39,43,44,47,48,50". Accordingly, tests TC_A, TC_B, TC_C, TC_E, and TC_F are grouped together as a first group of tests. Test TC_D forms a second group of tests, as described with reference to step 104 of flowchart 100.

Referring to flowchart 100, assume that based, for example, on their respective TATs and/or historical fault detection performances, tests TC_A, TC_B, TC_C, TC_E, and TC_F of the first group are prioritized in the following order TC_C, TC_B, TC_A, TC_E, and TC_F at step 105. Assume further that based on the allocated testing time and computing resources, as described above with reference to step 106 of flowchart 100, the user is to select only three tests for testing of the modified line. Since test TC_D is the only test of the second group of tests, the user selects test TC_D. The user also selects tests TC_C and TC_B from the first group of tests. If more testing time or computing resources are made available, the user may select more or all of the tests from the first group. It is understood that the grouping of the tests may result in N different groups each having M tests, where N and M are integers equal to or greater than 1. It is understood that M and N may or may not be equal to one another.

The execution paths, as described above, may be relatively long strings, as tests often include a relatively large number of functions. Thus, execution paths may require a large amount of disk space when stored in a database (e.g., Hadoop HBase). Accordingly, to optimize disk space, in one embodiment, only the hash values associated with execution paths are stored.

Shown below are hash values associated with the execution paths of a function used in a multitude of different tests. The hash values, which are determined using the MD5 algorithm and subsequently translated from binary strings to text using the Base64 algorithm in this example, are shown after the parameter "value". The number appearing after "t:" represents the test's unique identification (ID) number. The time stamp associated with each test represents the time at which the hash value is generated.

```
t:100056    timestamp = 1581055264551, value = ZFW3Auw0whUuxJIXjd1X9A
t:114686    timestamp = 1580468564265, value = ZFW3Auw0whUuxJIXjd1X9A
t:115236    timestamp = 1579894782763, value = ZFW3Auw0whUuxJIXjd1X9A
t:115304    timestamp = 1580797374235, value = ZFW3Auw0whUuxJIXjd1X9A
t:115318    timestamp = 1580504367979, value = ZFW3Auw0whUuxJIXjd1X9A
t:115331    timestamp = 1580566388916, value = ZFW3Auw0whUuxJIXjd1X9A
t:115334    timestamp = 1580714515375, value = ZFW3Auw0whUuxJIXjd1X9A
t:115350    timestamp = 1580502052937, value = ZFW3Auw0whUuxJIXjd1X9A
t:116       timestamp = 1580496896787, value = ZFW3Auw0whUuxJIXjd1X9A
t:127437    timestamp = 1580470637048, value = ZFW3Auw0whUuxJIXjd1X9A
t:127469    timestamp = 1580469620427, value = ZFW3Auw0whUuxJIXjd1X9A
t:127837    timestamp = 1574386994246, value = BLNxgzav1mqKMxa6YXhBuw
t:127903    timestamp = 1580486712487, value = ZFW3Auw0whUuxJIXjd1X9A
t:128027    timestamp = 1580567079965, value = ZFW3Auw0whUuxJIXjd1X9A
t:146389    timestamp = 1580516475839, value = ZFW3Auw0whUuxJIXjd1X9A
t:147145    timestamp = 1574412477113, value = BLNxgzav1mqKMxa6YXhBuw
t:147529    timestamp = 1580998558751, value = ZFW3Auw0whUuxJIXjd1X9A
t:147578    timestamp = 1580513291953, value = ZFW3Auw0whUuxJIXjd1X9A
t:147600    timestamp = 1580468785090, value = ZFW3Auw0whUuxJIXjd1X9A
t:147977    timestamp = 1580478566980, value = ZFW3Auw0whUuxJIXjd1X9A
t:148132    timestamp = 1580491696956, value = ZFW3Auw0whUuxJIXjd1X9A
t:148269    timestamp = 1580468872457, value = ZFW3Auw0whUuxJIXjd1X9A
t:148276    timestamp = 1580508040763, value = ZFW3Auw0whUuxJIXjd1X9A
t:148631    timestamp = 1580473754814, value = ZFW3Auw0whUuxJIXjd1X9A
t:148797    timestamp = 1580475845268, value = ZFW3Auw0whUuxJIXjd1X9A
t:149162    timestamp = 1580471020143, value = FD6Gi7uYHhyQSLVP2uBiCA
t:152590    timestamp = 1580510493721, value = ZFW3Auw0whUuxJIXjd1X9A
t:152594    timestamp = 1580493875732, value = ZFW3Auw0whUuxJIXjd1X9A
t:155359    timestamp = 1580456837818, value = ZFW3Auw0whUuxJIXjd1X9A
t:156230    timestamp = 1580446374945, value = ZFW3Auw0whUuxJIXjd1X9A
t:156611    timestamp = 1580455115280, value = ZFW3Auw0whUuxJIXjd1X9A
t:157113    timestamp = 1580471867617, value = ZFW3Auw0whUuxJIXjd1X9A
t:197005    timestamp = 1574412477113, value = BLNxgzav1mqKMxa6YXhBuw
```

The above data shows two unique execution paths. One execution path has a hash value of "BLNxgzav1mqKMxa6YXhBuw" associated with test IDs 127837, 147145, 197005 forming a first group of tests. The other execution path has a hash value of "ZFW3Auw0whUuxJIXjd1X9A" associated with all the other tests that form a second group of tests. As described with reference to steps 105 and 106 of flowchart 100, the tests in each group are optionally prioritized and reduced before being selected for testing of a modified code.

Figure 2:
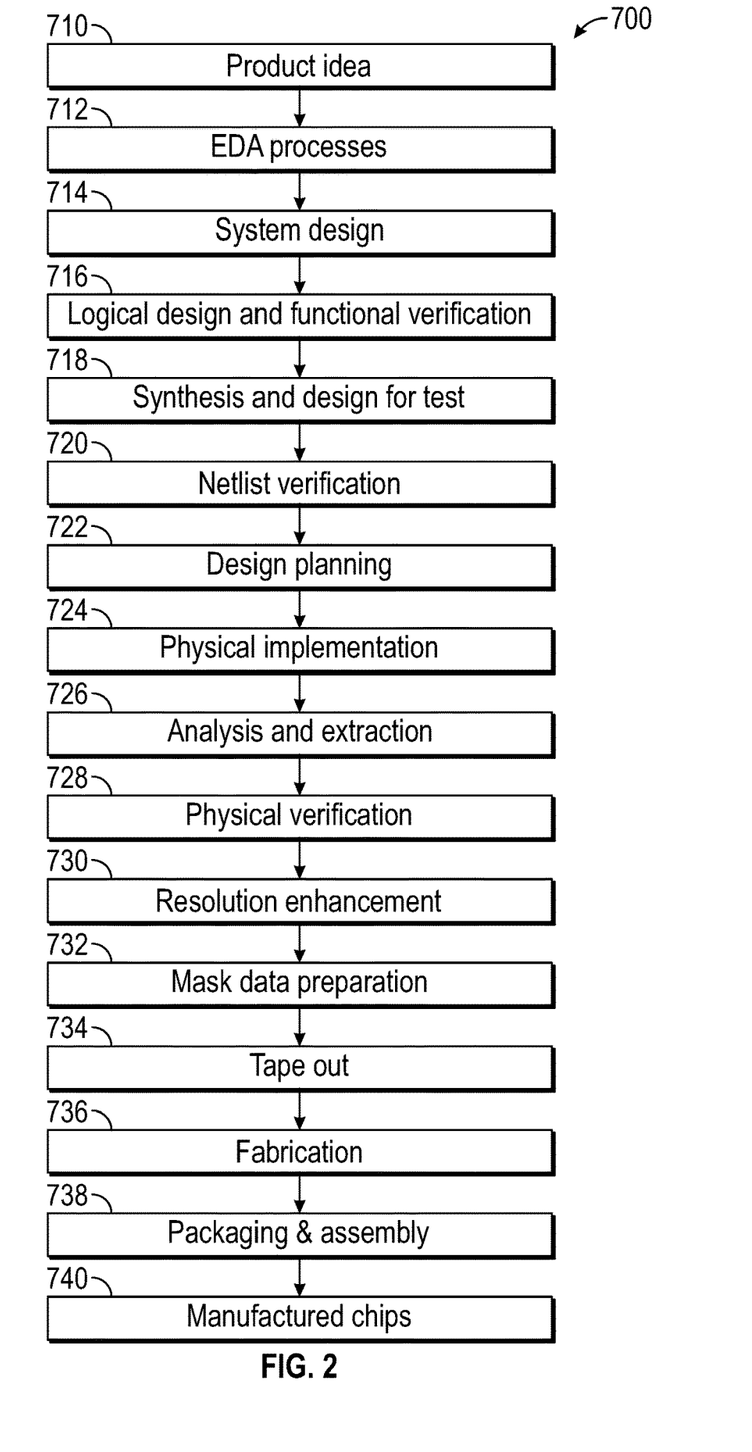
FIG. 2 is a flowchart of various processes used during the design and manufacture of an integrated circuit, in accordance with some embodiments of the present disclosure.

In some embodiments, the software in which a change is made is an electronic design automation software. FIG. 2 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 2. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 3) may be used to store the programs and data structures that are used by some or all of the EDA products described herein, and products used for development of cells for the library and for physical and logical design that use the library.

Figure 3:
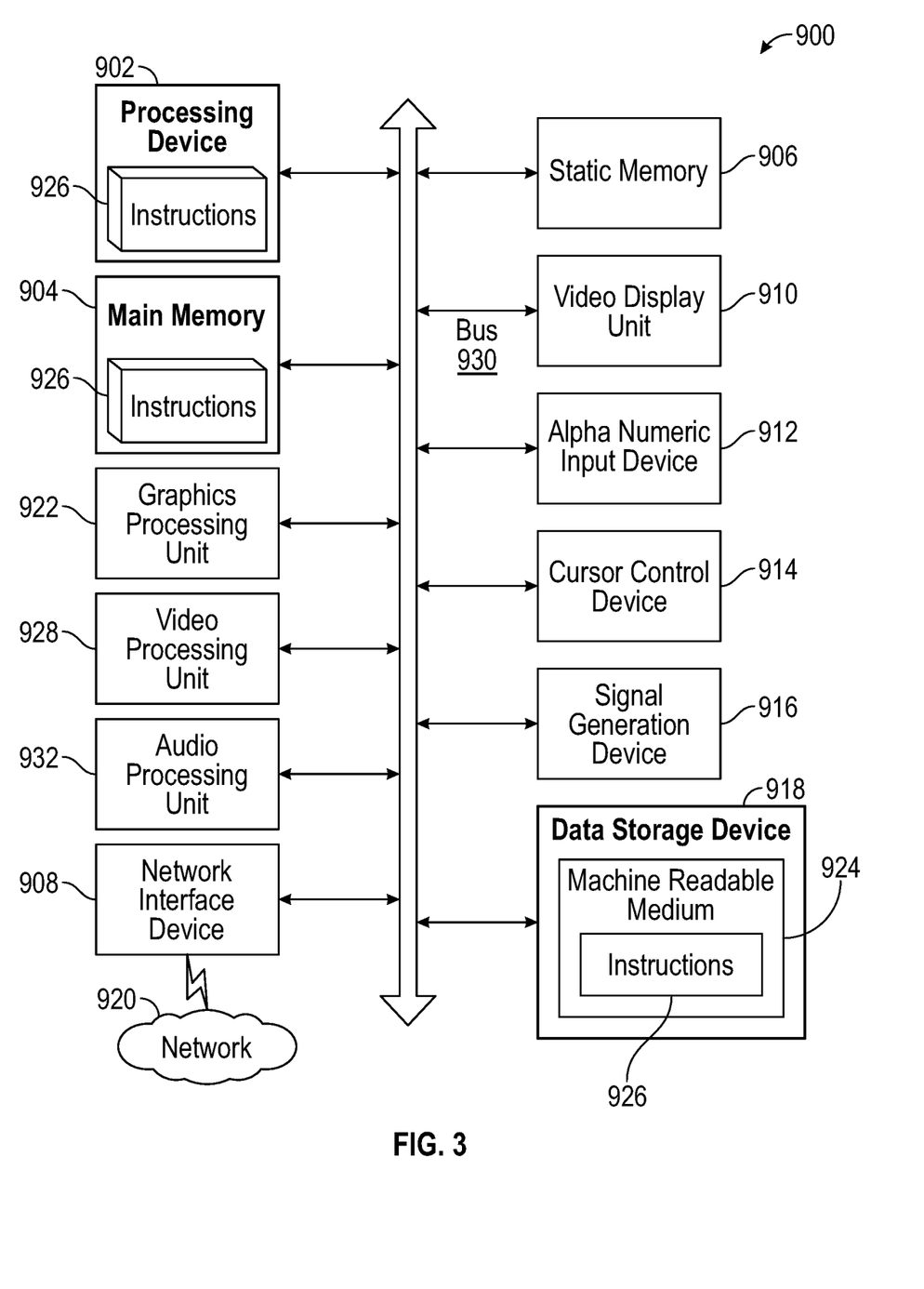
FIG. 3 is an example of a computer system in which embodiments of the present disclosure may operate.

FIG. 3 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of testing a change in a software code, the method comprising:
   searching, by a processor, a database of tests to identify a subset of tests from the database of tests that include a function that executes the software code change;
   forming, from the subset of tests, a plurality of test groups each having tests that include the same function that executes the software code change,
   wherein a first test group of the plurality of test groups includes one or more tests defined by a first set of line numbers in which the function appears,
   wherein a second test group of the plurality of test groups includes one or more tests defined by a second set of line numbers in which the function appears, and
   wherein the first set of line numbers and the second set of line numbers are different;
   prioritizing the tests within one or more of the first test group and the second test group based on one or more testing characteristics;
   selecting, from one or more of the first test group and the second test group, one or more of the prioritized tests to test the software code change; and
   executing the selected one or more prioritized tests.

2. The method of claim 1 further comprising:
   selecting the one or more prioritized tests from one or more of the first test group and the second test group in accordance with available computing resources.

3. The method of claim 1 wherein the testing characteristic of a test is defined by a turn-around time (TAT) of the test.

4. The method of claim 1 wherein the testing characteristic of a test is defined by a fault detection capability of the test.

5. The method of claim 1 wherein the search is performed using an open-source software tool.

6. The method of claim 5 wherein the open-source software tool comprises Gcov and ctags tools.

7. The method of claim 1 further comprising:
   generating a hash value associated with each of the first set of line numbers and the second set of line numbers;
   storing the hash values in the database; and
   searching the database using the hash values to identify the subset of tests that include the function.

8. The method of claim 7 wherein the hash values are obtained using an MD5 hashing algorithm.

9. The method of claim 1 further comprising:
   identifying a line number of the function within each of the subset of tests.

10. The method of claim 1 wherein a software in which the software code change is made is a design automation software used in development of an integrated circuit.

11. A non-transitory computer readable medium comprising stored instructions, which when executed by a processor, cause the processor to:
    search a database of tests to identify a subset of the tests that include a function that executes a software code change;
    form, from the subset, a plurality of groups each having a different execution path, wherein the tests in the same group have a same execution path for executing the software code change, and wherein the tests in the same group have the same execution path defined by one or more line numbers in the tests in which the function appears;

prioritize the tests within each of the plurality of groups based on one or more testing characteristics;

select, from each of the plurality of groups, one or more of the prioritized tests to test the software code change; and execute the selected one or more prioritized tests.

12. The non-transitory computer readable medium of claim 11 where the stored instruction further cause the processor to:

select the one or more prioritized tests from each group in accordance with available computing resources.

13. The non-transitory computer readable medium of claim 11 wherein the testing characteristic of a test is defined by a turn-around time (TAT) of the test.

14. The non-transitory computer readable medium of claim 11 wherein the testing characteristic of a test is defined by a fault detection capability of the test.

15. The non-transitory computer readable medium of claim 11 wherein the search is performed using an open-source software tool.

16. The non-transitory computer readable medium of claim 15 wherein the open-source software tool comprises Gcov and ctags open-source software tools.

17. The non-transitory computer readable medium of claim 11 where the stored instruction further cause the processor to:

generate a hash value associated with each of the execution paths;

store the hash values in the database; and search the database using the hash values to identify the subset of tests that execute the function.

18. The non-transitory computer readable medium of claim 17 wherein the hash values are obtained using an MD5 hashing algorithm.

19. The non-transitory computer readable medium of claim 11 where the stored instruction further cause the processor to:

identify a line number of the function within each of the subset of tests.

20. A system comprising:

a memory storing instructions; and a processor, coupled with the memory and to execute the instructions, the instructions when executed cause the processor to:

search a database of tests to identify a subset of the tests that include a function that executes a software code change;

form, from the subset, a plurality of groups each having a different execution path, wherein the tests in the same group have a same execution path for executing the software code change, and wherein the tests in the same group have the same execution path defined by one or more line numbers in the tests in which the function appears;

prioritize the tests within each of the plurality of groups based on one or more testing characteristics;

select, from each of the plurality of groups, one or more of the prioritized tests to test the software code change; and execute the selected one or more prioritized tests.

* * * * *